April 6, 1937.  A. F. JACKSON  2,075,900
PARKING DEVICE
Filed Aug. 25, 1934
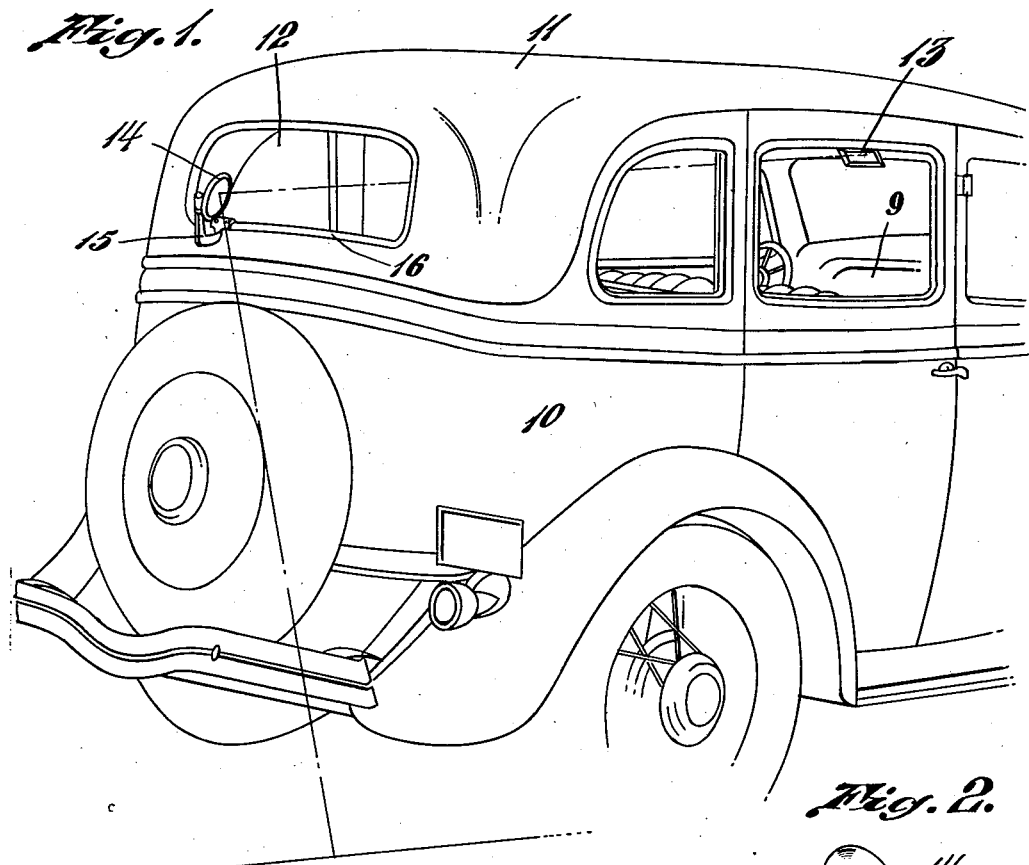
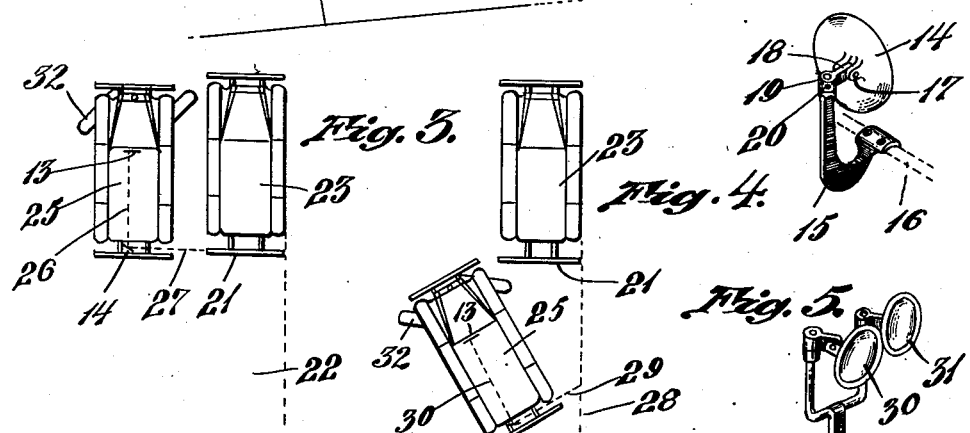
INVENTOR.
Alfred F. Jackson
BY Barlow & Barlow
ATTORNEYS.

Patented Apr. 6, 1937

2,075,900

UNITED STATES PATENT OFFICE 2,075,900

PARKING DEVICE

Alfred F. Jackson, Providence, R. I., assignor to Lewis R. Smith, receiver of Apco Mossberg Corporation, a corporation of Rhode Island Application August 25, 1934, Serial No. 741,456

1 Claim. (Cl. 88—86)

This invention relates to a motor vehicle parking device, and has for one of its objects a more simplified construction of parking device than that disclosed in my prior Patent No. 1,905,717, dated April 25, 1933.

Another object of the invention is the provision of means by which the motor vehicle may be more accurately parked and positioned than by the use of the device illustrated in said patent.

Another object of this invention is the provision of means by which an operator of a motor vehicle may know without trial manipulation when the forward wheel must be turned for most efficient parking of the motor vehicle.

Another object of the invention is the use of mirrors to reflect certain fixed points with reference to an obstruction, which must be avoided in laterally displacing the vehicle into a parking space, such as between two other spaced vehicles.

Another object of the invention is the provision of a mirror located adjacent the rear end of the automobile, which will cooperate with the rear vision mirror located above the dash where the driver may observe the same from his operating seat so that the fixing of the position for turning of the steering wheels may be determined as a result of objects observed in these mirrors.

With these and other objects in view, the invention consists of certain novel features of construction, as will be more fully described, and particularly pointed out in the appended claim.

In the accompanying drawing:

Fig. 1 is a perspective view of an automobile, showing my improved parking mirror mounted adjacent the rear window, and illustrating by dot-dash lines the reflection of the curb with reference to which the motor vehicle is about to be parked;

Fig. 2 is a perspective view of the mirror and its mounting bracket;

Fig. 3 is a diagrammatic view illustrating one definite position of the automobile which is about to be parked at which manipulation of the steering wheels occurs;

Fig. 4 is a diagrammatic view illustrating another definite position of the automobile at which further manipulation of the steering wheels occurs;

Fig. 5 is a perspective view of a modified form of mirror.

As pointed out in my previous patent above mentioned, there is considerable difficulty and annoyance experienced in parking an automobile in thickly trafficked places. I have found, however, that by the use of an adjustable mirror located adjacent the rear end of the motor vehicle, I may accomplish substantially all that is accomplished by the measuring device illustrated in my above said patent, with the exception of measuring the distance between two automobiles to determine the sufficiency of the space available for parking. This distance, however, may be estimated by the driver with far greater accuracy than a driver could estimate the point at which it is necessary to turn the front wheels of the vehicle for parking the same. And in order to accomplish this simplification, I have adjusted the mirror at the rear of the motor vehicle to be parked so that a point on the rear of an obstructing vehicle which is forward of the parking space may be observed in this mirror, such for instance as the rear bumper of the forward vehicle, and when this image is observed in the rear view mirror, I shall know that at this point the reverse of the vehicle with turning of the wheel should be had. The mirror is also adjusted so that when a point is reached at which the curb, with reference to which the vehicle is to be parked, is observed in the rear view mirror, it will be known that at this point the wheels should be turned in the opposite direction, and that when so turned, the forward end of the vehicle being parked will clear the obstructing vehicle forwardly of the parking space; and the following is a more detailed description of the present embodiment of this invention, illustrating one means by which these advantageous results may be accomplished.

With reference to the drawing, 10 designates a motor vehicle having a permanent top 11, a rear window 12, and a rear view mirror 13 located above the dash 9 in a position so that the driver may observe through the window 12, that which is happening in the rear. My parking mirror is designated 14 and is mounted by means of a bracket 15 upon the edge 16 of the rear window 12 or at any other place so as to be positioned substantially as shown in Figure 1. This mirror 14 is pivotally mounted as at 17 on an arm 18 for adjustment about a horizontal axis, while the arm 18 which carries this pivotal mounting 17, is itself swingably mounted about the pivot post 19 for adjustment about a vertical axis. Set screws such as 20 may be used for positively positioning the adjustment of the mirror about these two pivots 17 and 19 so that the desired angular relation of the mirror may be had.

For parking a car 25 in the space 22 between cars 23 and 24 by the use of the mirror 14, the first definite point which it is desired shall be reflected in the mirrors, is the bumper 21 of the car 23 ahead of the parking space 22, see Figure 3. The car 25 to be parked, is driven alongside of the car 23 and about one foot to the left thereof. The angular setting of the mirror 14 is such that when the driver observes in his rear view mirror 13, the bumper 21 of the car 23, it will be known that the car 25 is the proper distance ahead. Such angular setting of the mirror 14 is obtained by adjusting it about the pivot 17 and swinging the arm 18 around its pivot 19 until this angular relation is obtained where it will be secured by means of the set screw 20. The line of vision will be from the driver's seat forwardly to the rear view miror 13, thence rearwardly along the dotted line 26, as shown in Figure 3, to the mirror 14 and thence along the line 27 to the bumper 21. When this location, as shown in Figure 3, has been reached, the front wheels 32 will be turned to the right as far as they will go. The vehicle 25 will then be backed which will cause it to assume a position such as shown in Figure 4, and it is now necessary to fix a second point at which the front wheels 32 shall be turned, and this is accomplished by an additional adjustment of the mirror 14 about its horizontal axis 17 so that at a certain location in the travel of the vehicle 25 to be parked, the curbing designated 28 will come into view in the mirror. Assuming that the position as illustrated in Figure 4, is the proper position at which the curbing 28 should appear in the mirror, the mirror 14 will be adjusted about its horizontal pivotal point 17 so that at this point the curbing will be reflected into the rear vision mirror 13 along the dotted lines 29 and 30. When this position has been arrived at, the front wheels 32 will be swung in an opposite direction as far as they may be turned, such as illustrated in Figure 4, at which point it will be known that the forward end of the car 25 to be parked will clear the rear bumper 21 of the car 23 which is ahead.

Thus, in parking the car 25 it is merely necessary to drive alongside of the car ahead 23 about a foot to the left of it until the rear view mirror by reason of my parking mirror 14 reflects the rear bumper 21 of the car 23, then to turn the wheels to the right as far as they will go and reverse movement of the car 25 until the curbstone 28 is picked up in the rear view mirror, then to turn the wheels 32 as far to the left as they will go and continue reversing until the car is brought into the proper location 22 for parking.

By measurement, the turning radius to the right of each make and model car may be determined; likewise, the turning radius to the left, and with these dimensions or radii a formula may be worked out indicating the proper longitudinal position of the car 25 with reference to the car 23, at which time the wheels 32 will be turned to the right; likewise, the position of the car 25, as indicated in Figure 4, may also be mathematically determined, and from these mathematical relations the angular relations of the mirror 14 about its horizontal and about its vertical axis may be mathematically determined so that the fitting of the mirror as to its angular relation may be mathematically determined and set for each model or make of car upon which it is to be used. The variations in the heights of the bumpers 21 or the heights of the curbstones are found through practice to vary in such small ranges as not to be important in the practical working in the use of my parking mirror.

By the simple mirror which I have illustrated, which may be made efficiently and economically, I may actually observe more accurately by reason of the reflection in the two mirrors the position which the car must take, as shown in Figure 3, and also by the reflection in these two mirrors, I may more accurately observe the curbstone with reference to which the car is to be parked than was possible by a driver estimating his alignment opposite a starting point and then the measurement over the ground, as occurred in my prior patent mentioned above.

In some instances, I may use a concaved mirror or I may desire to use two concaved mirrors or sections of a mirror as 30 and 31, and adjust one for the observation of the bumper 21 and the other for the observation of the curb 28. In some cases, the mirror 14, or the mirrors 30, 31 may be placed inside of a closed automobile so that the outside appearance of the automobile will be undisturbed.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

In combination with a motor vehicle, a rear view mirror forward of the driver's seat, reflecting means fixed at the rear of the vehicle in reflecting relationship with said mirror, said reflecting means being so positioned as to cooperate with said rear view mirror to bring to the center of the field of vision of a person in the driver's seat an image of the rear bumper of a second vehicle which is between one and two feet to the right of said first vehicle when the rear ends of the two vehicles are approximately on the same line transverse to the curb, and to bring to the center of the field of vision of a person in the driver's seat an image of the curb along which the vehicle is to be parked after the vehicle has been backed, with its wheels turned to the fullest extent to the right a distance such that when the backing movement is continued with the wheels turned to the fullest extent to the left, the vehicle will clear the said second vehicle.

ALFRED F. JACKSON.